(12) United States Patent
Manna et al.

(10) Patent No.: US 8,283,301 B2
(45) Date of Patent: Oct. 9, 2012

(54) SCALE-REDUCING ADDITIVE FOR AUTOMATIC DISHWASHING SYSTEMS

(75) Inventors: Joseph Manna, Mundelein, IL (US); Jan Edward Shulman, Newtown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 65 days.

(21) Appl. No.: 12/932,860

(22) Filed: Mar. 8, 2011

(65) Prior Publication Data

US 2011/0224119 A1    Sep. 15, 2011

Related U.S. Application Data

(60) Provisional application No. 61/311,920, filed on Mar. 9, 2010.

(51) Int. Cl.
*C11D 3/37* (2006.01)
*C11D 3/30* (2006.01)

(52) U.S. Cl. ........ 510/230; 510/220; 510/223; 510/229; 510/398; 510/480

(58) Field of Classification Search .................. 510/220, 510/223, 229, 230, 398, 480
See application file for complete search history.

(56) References Cited

U.S. PATENT DOCUMENTS 4,176,059 A * 11/1979 Suzuki .................... 210/697
* cited by examiner

*Primary Examiner* — Charles Boyer
(74) *Attorney, Agent, or Firm* — Marcella M. Bodner

(57) ABSTRACT

An automatic dishwashing detergent composition having at least two components. The first component is a polymer containing polymerized residues of at least one $C_3$-$C_6$ carboxylic acid monomer and a lactone end group. The second component is a biodegradable builder selected from among nitrilotriacetic acid, ethylenediaminetetraacetic acid, diethylenetriaminepentaacetic acid, glycine-N,N-diacetic acid, methylglycine-N,N-diacetic acid, 2-hydroxyethyliminodiacetic acid, glutamic acid-N,N-diacetic acid, 3-hydroxy-2,2'-iminodisuccinate, S,S-ethylenediaminedisuccinate aspartic acid-diacetic acid, N,N'-ethylenediamine disuccinic acid, iminodisuccinic acid, aspartic acid, aspartic acid-N,N-diacetate, beta-alaninediacetic acid, polyaspartic acid, salts thereof and combinations thereof.

10 Claims, No Drawings

SCALE-REDUCING ADDITIVE FOR AUTOMATIC DISHWASHING SYSTEMS

This application claims the benefit of priority under 35 U.S.C. §119(e) of U.S. Provisional Patent Application Nos. 61/311,920 filed on Mar. 9, 2010.

BACKGROUND

This invention relates generally to a formulation that minimizes mixed inorganic deposits in non-phosphate or low-phosphate automatic dishwashing systems.

Automatic dishwashing detergents are generally recognized as a class of detergent compositions distinct from those used for fabric washing or water treatment. Automatic dishwashing detergents are required to produce a spotless and film-free appearance on washed items after a complete cleaning cycle. Phosphate-free or low-phosphate compositions rely on non-phosphate builders, such as salts of citrate, carbonate, silicate, disilicate, bicarbonate, aminocarboxylates and others to sequester calcium and magnesium from hard water, and upon drying, can leave an insoluble visible deposit. Polymers made from (meth)acrylic acid and maleic acid are known for use in inhibiting the scale or other insoluble deposits produced from non-phosphate builders. For example, WO 2009/123322 discloses polymers made from acrylic acid, maleic acid and a sulfonated monomer in a composition containing biodegradable builders. However, this reference does not disclose a composition containing a polymer with a lactone end group.

The problem addressed by this invention is to find a composition capable of reducing formation of mixed inorganic deposits.

STATEMENT OF INVENTION

The present invention is directed to an automatic dishwashing detergent composition comprising: (a) a polymer comprising polymerized residues of at least one $C_3$-$C_6$ carboxylic acid monomer and a lactone end group; and (b) a biodegradable builder selected from the group consisting of nitrilotriacetic acid, ethylenediaminetetraacetic acid, diethylenetriaminepentaacetic acid, glycine-N,N-diacetic acid, methylglycine-N,N-diacetic acid, 2-hydroxyethyliminodiacetic acid, glutamic acid-N,N-diacetic acid, 3-hydroxy-2,2'-iminodisuccinate, S,S-ethylenediaminedisuccinate aspartic acid-diacetic acid, N,N'-ethylenediamine disuccinic acid, iminodisuccinic acid, aspartic acid, aspartic acid-N,N-diacetate, beta-alaninediacetic acid, polyaspartic acid, salts thereof and combinations thereof.

DETAILED DESCRIPTION

All percentages are weight percentages (wt %), unless otherwise indicated and all temperatures are in ° C., unless otherwise indicated. Weight average molecular weights, $M_w$, are measured by gel permeation chromatography (GPC) using polyacrylic acid standards, as is known in the art. The techniques of GPC are discussed in detail in Modern Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. The molecular weights reported herein are in units of daltons. As used herein the term "(meth)acrylic" refers to acrylic or methacrylic. Preferably, the biodegradable builders are present as sodium, potassium or lithium salts; preferably sodium or potassium; preferably sodium. Preferred biodegradable builders include glycine-N,N-diacetic acid, methylglycine-N,N-diacetic acid, 2-hydroxyethyliminodiacetic acid, polyaspartic acid, iminodisuccinic acid, 3-hydroxy-2,2'-iminodisuccinate, glutamic acid-N,N-diacetic acid and salts thereof. Preferably, the composition is "phosphorus-free," i.e., it contains less than 0.5 wt % phosphorus (as elemental phosphorus), preferably less than 0.2 wt %, preferably less than 0.1 wt %, preferably no detectable phosphorus. Preferably, the composition is "low-phosphate," i.e., it contains from 0.5 to 3 wt % phosphorus (as elemental phosphorus), preferably from 0.5 to 1.5 wt %. Preferably, the composition contains less than 2 wt % of low-molecular weight (less than 1,000) phosphonate compounds (e.g., 1-hydroxyethylidene-1,1-diphosphonic acid (HEDP), and salts), preferably less than 1 wt %, preferably less than 0.5 wt %, preferably less than 0.2 wt %, preferably less than 0.1 wt %. A "$C_3$-$C_6$ carboxylic acid monomer" is a mono-ethylenically unsaturated compound having one or two carboxylic acid groups, e.g., (meth)acrylic acid, maleic acid, fumaric acid, itaconic acid, maleic anhydride, crotonic acid, etc. Preferably, the polymer comprises at least 50 wt % polymerized residues of at least one $C_3$-$C_6$ carboxylic acid monomer, preferably at least 60 wt %, preferably at least 70 wt %, preferably at least 80 wt %, preferably at least 85 wt %, preferably at least 90 wt %, preferably at least 95 wt %, preferably at least 98 wt %, preferably at least 99 wt %. Preferably, the $C_3$-$C_6$ carboxylic acid monomer is selected from among (meth)acrylic acid and maleic acid, preferably (meth)acrylic acid, preferably acrylic acid.

Preferably, the lactone end group is one produced by an internal esterification reaction between a carboxylic acid substituent on a polymerized carboxylic acid monomer residue and a terminal hydroxy group derived from a chain transfer agent, most often a γ-lactone, as shown below

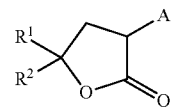

wherein A is a polymer chain comprising polymerized residues of (meth)acrylic acid; $R^1$ and $R^2$ independently may be hydrogen, methyl, ethyl, propyl or butyl; providing that $R^1$ and $R^2$ contain a total of at least two carbon atoms. For example, when isopropanol is used as a chain transfer agent in polymerization of acrylic acid it produces a terminal hydroxy group on the polyacrylic acid chain which may react with a carboxylic acid to produce a γ-lactone end group, as shown below

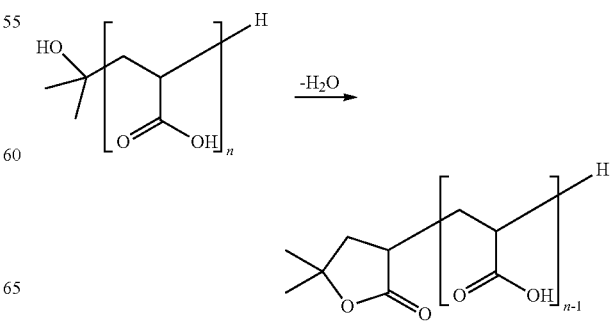

Preferably, secondary alcohols are used as chain transfer agents, resulting in the generic γ-lactone end group shown below for a polyacrylic acid

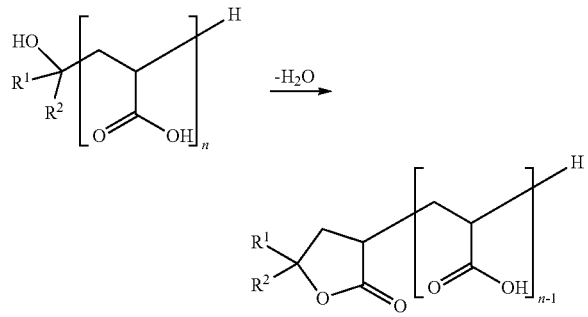

Use of larger alcohols than isopropanol as chain transfer agents potentially could lead to alternative structures resulting from radical formation at non-hydroxy-bearing carbon atoms, possibly including δ-lactones.

Other polymerized monomer residues which may be present in the polymer include, e.g., non-ionic (meth)acrylate esters, cationic monomers, monounsaturated dicarboxylates, saturated (meth)acrylamides, vinyl esters, vinyl amides (including, e.g., N-vinylpyrrolidone), sulfonated acrylic monomers, styrene and α-methylstyrene.

The total weight of biodegradable builders in the composition is from 2 to 40 wt % of the total weight of the composition. Preferably, total weight of biodegradable builders is at least 5 wt %, preferably at least 7 wt %, preferably at least 8 wt %, preferably at least 9 wt %, preferably at least 10 wt %. Preferably, the total weight of biodegradable builders is no more than 35 wt %, preferably no more than 30 wt %, preferably no more than 25 wt %, preferably no more than 20 wt %, preferably no more than 17 wt %, preferably no more than 15 wt %, preferably no more than 14 wt %, preferably no more than 13 wt %, preferably no more than 12 wt %. Preferably, the composition further comprises an alkali metal citrate, carbonate, bicarbonate and/or aminocarboxylate. Preferably, the amount of alkali metal citrate is from 0.01 to 40 wt %, preferably no more than 35 wt %, preferably no more than 30 wt %, preferably no more than 25 wt %, preferably no more than 20 wt %.

Preferably, the polymer contains no more than 40 wt % polymerized residues of esters of acrylic or methacrylic acid, preferably no more than 30 wt %, preferably no more than 20 wt %, preferably no more than 10 wt %, preferably no more than 5 wt %, preferably no more than 2 wt %, preferably no more than 1 wt %, preferably no more than 0.5 wt %. Preferably, the polymer comprises at least 70 wt % polymerized residues of monomers selected from (meth)acrylic acid, maleic acid, fumaric acid and itaconic acid, and no more than 30 wt % polymerized residues of esters of acrylic or methacrylic acid; preferably at least 80 wt % polymerized residues of monomers selected from (meth)acrylic acid, maleic acid, fumaric acid and itaconic acid, and no more than 20 wt % polymerized residues of esters of acrylic or methacrylic acid. Preferably, the polymer contains no more than 30 mole % of 2-acrylamido-2-methylpropanesulfonic acid (AMPS) (including metal or ammonium salts) or other sulfonic acrylic monomers (e.g., allyloxybenzenesulfonic acid, methallylsulfonic acid and (meth)allyloxy benzenesulfonic acid), preferably no more than 20 mole %, preferably no more than 10 mole %, preferably no more than 5 mole %, preferably no more than 2 mole %, preferably no more than 1 mole %, preferably no more than 0.5 mole %.

Preferably, the polymer has $M_w$ from 1,000 to 90,000. Preferably, $M_w$ is at least 2,000, preferably at least 3,000, preferably at least 4,000, preferably at least 5,000, preferably at least 6,000. Preferably, $M_w$ is no more than 70,000, preferably no more than 50,000, preferably no more than 40,000, preferably no more than 30,000, preferably no more than 20,000, preferably no more than 15,000, preferably no more than 10,000.

The polymer may be used in combination with other polymers useful for controlling insoluble deposits in automatic dishwashers, including, e.g., polymers comprising combinations of residues of acrylic acid, methacrylic acid, maleic acid or other diacid monomers, esters of acrylic or methacrylic acid including polyethylene glycol esters, styrene monomers, AMPS and other sulfonic acid monomers, and substituted acrylamides or methacrylamides.

The polymer of this invention may be produced by any of the known techniques for polymerization of acrylic monomers, e.g., solution polymerization and emulsion polymerization; solution polymerization is preferred. Preferably, the initiator does not contain phosphorus. Preferably, the polymer contains less than 1 wt % phosphorus, preferably less than 0.5 wt %, preferably less than 0.1 wt %, preferably the polymer contains no phosphorus. The chain transfer agent comprises an alcohol, preferably isopropanol. The polymer may be in the form of a water-soluble solution polymer, slurry, dried powder, or granules or other solid forms.

Other components of the automatic dishwashing detergent composition may include, e.g., surfactants, oxygen and/or chlorine bleaches, bleach activators, enzymes, foam suppressants, colors, fragrances, antibacterial agents and fillers. Typical surfactant levels depend on the particular surfactant used, typically from 0.1 wt % to 10 wt %, preferably from 0.5 wt % to 5 wt %. Fillers in tablets or powders are inert, water-soluble substances, typically sodium or potassium salts, e.g., sodium or potassium sulfate and/or chloride, and typically are present in amounts ranging from 0 wt % to 75 wt %, preferably from 5% to 50%, preferably from 10% to 40%. Fillers in gel formulations may include those mentioned above and also water. Fragrances, dyes, foam suppressants, enzymes, corrosion inhibitor and antibacterial agents usually total no more than 5 wt % of the composition.

Preferably, the composition contains from 5 to 20 wt % of a percarbonate salt, preferably from 8 to 15 wt %, preferably from 10 to 15 wt %. Preferably, the composition has a pH (at 1 wt % in water) of at least 9, preferably at least 10.5; preferably the pH is no greater than 12.5, preferably no greater than 11.5.

The composition can be formulated in any typical form, e.g., as a tablet, powder, monodose, multi-component monodose, sachet, paste, liquid or gel. The composition can be used under typical operating conditions for any typical automatic dishwasher. Typical water temperatures during the washing process preferably are from 20° C. to 85° C., preferably from 30° C. to 70° C. Typical concentrations for the composition as a percentage of total liquid in the dishwasher preferably are from 0.1 to 1 wt %, preferably from 0.2 to 0.7 wt %. With selection of an appropriate product form and addition time, the composition may be present in the prewash, main wash, penultimate rinse, final rinse, or any combination of these cycles. The polymer of the present invention can be formulated in a number of ways in the dishwashing detergent. For example, the polymer could be formulated with the inorganic builders, biodegradable builders, fillers, surfactants, bleaches, enzymes, and so forth. Alternatively, for example, the polymer could be formulated with the surfactant, citric acid, solvents, and other optional ingredients. Additionally, the polymer could be located in one or more compartments within an engineered unit dose product so as to release at a different point during the wash cycle than the biodegradable builder.

Preferably, the composition comprises from 0.5 to 12 wt % of said polymer. Preferably, the composition comprises at least 1 wt % of the polymer, preferably at least 1.5 wt %, preferably at least 2 wt %, preferably at least 2.5 wt %. Preferably, the composition comprises no more than 10 wt % of the polymer, preferably no more than 8 wt %, preferably no more than 6 wt %, preferably no more than 5 wt %, preferably no more than 4 wt %. Polymers of this invention may be blended with polymers made from sulfonic acid monomers.

EXAMPLES

Polymer Testing—

All polymers were tested for scale reduction by incorporating them as described below, with "Prototype 1F", as described below and washing glasses for 5 cycles in a KENMORE QUIETGUARD dishwasher (solids added to main wash cycle) using water with 400 ppm hardness (2:1 $Ca^{+2}$:$Mg^{+2}$) at 130° F. (54.4° C.) with no food soil. Glasses were evaluated after 3 and 5 cycles using the scale from ASTM method 3556-85 (1=clean, 5=heavy film).

Results—

3.2 grams active trisodium salt of methylglycinediacetic were added to each experiment along with 28 grams of Formulation Protoype 1F.

| Formulation | scaling rating 3 Cycles |
|---|---|
| 1) 28 grams Prototype 1F + 8 grams TRILON M (40%) w/o polymer | 2.47 |
| 2) 28 grams Prototype 1F + 8 grams TRILON M (40%) w/1.6 grams liquid Comp. poly. A (50%) | 2.43 |
| 3) 28 grams Prototype 1F + 8 grams TRILON M (40%) w/1.78 grams liquid Comp. poly. B (45.53%) | 2.80 |
| 4) 28 grams Prototype 1F + 8 grams TRILON M (40%) w/2.02 grams liquid ANTIPREX A (39.7%) | 2.33 |
| 5) 28 grams Prototype 1F + 8 grams TRILON M (40%) w/2.16 grams liquid Comp. poly. C (37%) | 2.40 |

TRILON M is an aqueous solution of the trisodium salt of methylglycinediacetic acid (Na3MGDA), available from BASF Corp.

| Formulation | scaling rating 5 Cycles |
|---|---|
| 1) 28 grams Prototype 1F + 8 grams TRILON M (40%) w/o polymer | 2.97 |
| 2) 28 grams Prototype 1F + 8 grams TRILON M (40%) w/1.6 grams liquid Comp. poly. A (50%) | 3.03 |
| 3) 28 grams Prototype 1F + 8 grams TRILON M (40%) w/1.78 grams liquid Comp. poly. B (45.53%) | 3.40 |
| 4) 28 grams Prototype 1F + 8 grams TRILON M (40%) w/2.02 grams liquid ANTIPREX A (39.7%) | 2.77 |
| 5) 28 grams Prototype 1F + 8 grams TRILON M (40%) w/2.16 grams liquid Comp. poly. C (37%) | 2.70 |

| Ingredient | % of formulation |
|---|---|
| Sodium Citrate | 22.9% |
| TRILON M (40%) | 0.0% |
| Sodium Carbonate | 11.4% |
| Sodium Bicarbonate | 11.4% |
| BRITESIL H20 | 11.4% |
| Sodium Percarbonate | 11.4% |
| TERGITOL L-61 | 1.7% |
| Polymer | 0.0% |
| Sodium Sulfate | 29.7% |
| total | 100.0% |

Polymer Samples:

Comparative polymer A (Mw=2220)=90% acrylic acid/10% maleic acid, sodium salt. Phosphono end group.

Comparative polymer B (Mw=7,201) 100% acrylic acid polymer with sulfonate end group. ANTIPREX A (available from Ciba Corp.) (Mw=6,877) 100% acrylic acid polymer with a γ-lactone end group having geminal methyl groups.

Comparative polymer C (Mw 22,974) 70% acrylic acid/30% 2-acrylamido-2-methyl-1-propane sulfonic acid, sodium salt with sulfonate end group.

Comp. polymer A was added at a level of 1.6 wet g/cycle @ 50% solids=0.8 g active Comp. polymer B was added at a level of 1.78 wet g/cycle @ 45.53% solids=0.8 g active Polymer A was added at a level of 2.02 wet g/cycle @ 39.7% solids=0.8 g active Comp. polymer C was added at a level of 2.16 wet g/cycle @ 37% solids=0.8 g active

The invention claimed is:

1. An automatic dishwashing detergent composition comprising: (a) a polymer comprising polymerized residues of at least one $C_3$-$C_6$ carboxylic acid monomer and a lactone end group; and (b) a biodegradable builder selected from the group consisting of nitrilotriacetic acid, ethylenediaminetetraacetic acid, diethylenetriaminepentaacetic acid, glycine-N,N-diacetic acid, methylglycine-N,N-diacetic acid, 2-hydroxyethyliminodiacetic acid, glutamic acid-N,N-diacetic acid, 3-hydroxy-2,2'-iminodisuccinate, S,S-ethylenediaminedisuccinate aspartic acid-diacetic acid, N,N'-ethylenediamine disuccinic acid, iminodisuccinic acid, aspartic acid, aspartic acid-N,N-diacetate, beta-alaninediacetic acid, polyaspartic acid, salts thereof and combinations thereof.

2. The composition of claim 1 in which the polymer comprises at least 50 wt % polymerized residues of at least one $C_3$-$C_6$ carboxylic acid monomer.

3. The composition of claim 2 in which the lactone end group is a γ-lactone.

4. The composition of claim 3 in which the polymer has $M_w$ from 2,000 to 40,000.

5. The composition of claim 4 comprising from 1 to 8 wt % of the polymer.

6. The composition of claim 5 in which the polymer has formula

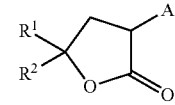

wherein A is a polymer chain comprising polymerized residues of at least one $C_3$-$C_6$ carboxylic acid monomer; $R^1$ and $R^2$ are methyl.

7. The composition of claim 6 in which the composition comprises from 5 to 20 wt % of the biodegradable builder.

8. The composition of claim 7 in which the polymer comprises at least 70 wt % polymerized residues of at least one monomer selected from the group consisting of (meth)acrylic acid and maleic acid.

9. The composition of claim 8 in which in which the polymer has $M_w$ from 4,000 to 30,000.

10. The composition of claim 9 comprising methylglycine-N,N-diacetic acid, glycine-N,N-diacetic acid, glutamic acid-N,N-diacetic acid, salts thereof or combinations thereof.

* * * * *